(No Model.)
T. D. LINES.
COUPLING FOR VEHICLE SPRINGS.
No. 277,585. Patented May 15, 1883.
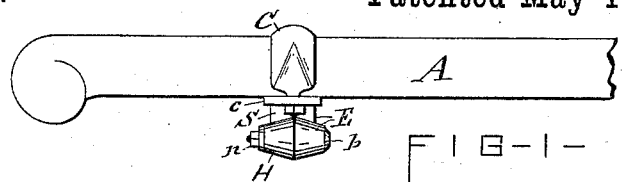
FIG-1-
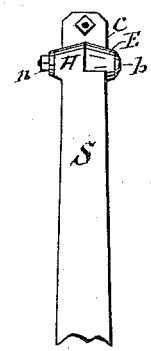
FIG-2-
FIG-3-
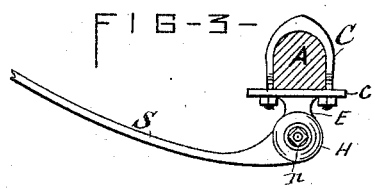
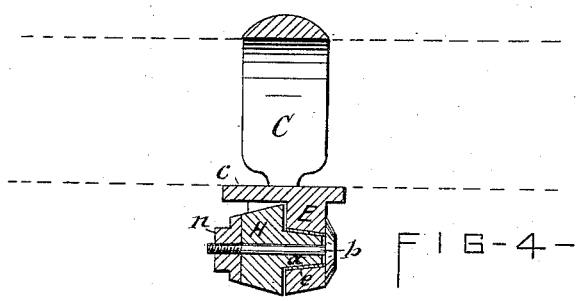
FIG-4-
WITNESSES —
Wm C. Raymond
C. Benedison
INVENTOR —
Thomas D. Lines
per Duell, Laass & Hey
his Attys

UNITED STATES PATENT OFFICE.

THOMAS D. LINES, OF SYRACUSE, NEW YORK.

COUPLING FOR VEHICLE-SPRINGS.

SPECIFICATION forming part of Letters Patent No. 277,585, dated May 15, 1883.

Application filed February 26, 1883. (No model.)

*To all whom it may concern:*

Be it known that I, THOMAS D. LINES, of Syracuse, in the county of Onondaga, in the State of New York, have invented new and useful Improvements in Couplings for Springs of Vehicles, of which the following, taken in connection with the accompanying drawings, is a full, clear, and exact description.

This invention relates to the connection of cross-springs with the side bars of a vehicle; and it consists in forming the clip-bar, which is secured to the under side of the side bar, with a rigid pendent ear, which is set to one side of the center of said clip-bar, and is provided with an eye, and in forming the end of the cross-spring with a laterally-projecting lug, which enters the aforesaid eye, and is provided with an axial hole for the reception of a bolt by which said parts are tied together, all as hereinafter more fully described, and specifically set forth in the claim.

In the accompanying drawings, Figure 1 is a side view of that portion of the side bar of a vehicle to which my improved spring-coupling is applied. Fig. 2 is an inverted plan view of said coupling. Fig. 3 is a front view of the same, and Fig. 4 is an enlarged transverse section of the coupling.

Similar letters of reference indicate corresponding parts.

A represents the side bar of a vehicle, and S the cross-spring, connected to said side bar and supporting the body of the vehicle. The connection of said spring with the side bar I construct as follows: To the side bar I apply a clip, C, of ordinary form. The clip-bar $c$, which is extended across the under side of the side bar and connected to the clip in the usual manner, I form in one piece with a pendent ear, E, which is set to one side of the center of the clip-bar, for the purpose hereinafter explained. The ear E has transversely through it an orifice, $e$, which is preferably tapered toward the outer side of the ear, as shown in Fig. 4 of the drawings. The end of the cross-spring S, I form with a head, H, which fits against the vertical side of the ear E underneath the clip-bar $c$, and from said head projects laterally a lug, $a$, which enters and is fitted to the orifice $e$ of the ear E, and thus forms a hold for the spring S on said ear. Said parts are retained in their interlocked position by a bolt, $b$, passing through an axial hole in the head H and its lug $a$, and having a bead, $b$, against the outer side of the ear E, and a nut, $n$, bearing against the outer side of the head H. By tapering the lug $a$ and its receiving-orifice $e$, and leaving a little end-play on the former, said parts can be tightened to take up lost motion and prevent rattling by tightening the nut $n$ of the coupling-bolt $b$.

If desired, a leather or rubber bushing can be introduced between the eye $e$ and lug $a$, to further guard against the rattling of the coupling.

The object of setting the ear E to one side of the center of the clip-bar is to bring the spring S directly under the clip-bar, as seen in Figs. 2 and 4 of the drawings.

Having described my invention, what I claim is—

In combination with the side bar of a vehicle, the clip-bar C, formed in one piece with the ear E set to one side of the center thereof, and provided with the orifice $e$, and the spring S, having its end formed with the head H and laterally-projecting lug $a$, entering the orifice $e$ and the coupling-bolt $b$, passing through the head H and its lug, and fastening the spring to the ear E, substantially as described and shown.

In testimony whereof I have hereunto signed my name and affixed my seal, in the presence of two attesting witnesses, at Syracuse, in the county of Onondaga, in the State of New York, this 21st day of February, 1883.

THOMAS D. LINES. [L. S.]

Witnesses:
C. H. DUELL,
WILLIAM C. RAYMOND.